United States Patent [19]
Larsson

[11] Patent Number: 4,904,148
[45] Date of Patent: Feb. 27, 1990

[54] ROBOT ARM FOR AN INDUSTRIAL ROBOT

[75] Inventor: Ove Larsson, Gothenburg, Sweden

[73] Assignee: Kabushiki Kaisha Komatsu Seisakusho, Tokyo, Japan

[21] Appl. No.: 237,794

[22] PCT Filed: Nov. 26, 1987

[86] PCT No.: PCT/JP87/00913
§ 371 Date: Jul. 20, 1988
§ 102(e) Date: Jul. 20, 1988

[87] PCT Pub. No.: WO88/03856
PCT Pub. Date: Jun. 2, 1988

[30] Foreign Application Priority Data
Nov. 26, 1986 [SE] Sweden ............... 8605070

[51] Int. Cl.$^4$ .............................. B25J 17/00
[52] U.S. Cl. ..................... 414/680; 74/479; 901/15; 901/28; 901/23
[58] Field of Search ........... 414/680, 735; 901/15, 901/28, 29, 23; 74/479

[56] References Cited
U.S. PATENT DOCUMENTS

| | | | |
|---|---|---|---|
| 4,645,509 | 2/1987 | Gorman | 901/29 X |
| 4,651,591 | 3/1987 | Wurst | 901/28 X |
| 4,657,472 | 4/1987 | Zimmer | 901/29 X |
| 4,683,406 | 7/1987 | Ikeda et al. | 901/15 X |

FOREIGN PATENT DOCUMENTS 59-4276 1/1984 Japan.
59-39195 3/1984 Japan.
61-31890 6/1986 Japan.

*Primary Examiner*—Robert J. Spar
*Assistant Examiner*—Donald W. Underwood
*Attorney, Agent, or Firm*—Diller, Ramik & Wight

[57] ABSTRACT

A robot arm usable for an industrial robot adapted to freely bend to realize a pattern of movement having a high ability of movement, excellent reachability and high accuracy by virtue of a comparatively small amount of rotational movement and a comparatively large amount of translational movement. The robot arm has cylindrical arm portions (14, 15, 16) flexibly connected to one after another via joints, and the arm portions comprise one upper arm (14), at least one intermediate arm (15) and one lower arm (16). An arm portion which belongs to a certain joint is formed with joint faces (21) which are inclined with respect to a longitudinally extending axis (29). A joint axis (22) of this joint extends at a right angle with respect to each of the joint faces (21). Each of the arm portions is freely turnable about the joint axis (22) independently of adjacent one or plural arm portions. Additionally, inclined joint faces located at opposite ends of the intermediate arm are formed in such a manner that their extensions intersect one another at a position located outwardly of the outer boundary of the intermediate arm.

5 Claims, 6 Drawing Sheets

ROBOT ARM FOR AN INDUSTRIAL ROBOT

TECHNICAL FIELD

The present invention relates to a robot arm usable for an industrial robot which can articulate to realize a pattern of movement including a high ability of movement, excellent reachability and high accuracy by virtue of a comparatively small amount of rotational movement and a comparatively large amount of translational movement and more particularly to a robot arm usable for an industrial robot which includes a plurality of pipe-shaped arm portions flexibly connected to one another via a plurality of joints serving as a joint member wherein these arm portions comprise one upper arm, at least one intermediate intermediate arm and one lower arm.

BACKGROUND ART

Generally, in a case where a variety of operations such as spray coating, paint applying operation, arc welding or the like are performed using an industrial robot, such a significant requirement that an arm of the industrial robot holding a tool such as an injection nozzle or the like should approach closer to an object (for instance, a vehicle) without an occurrence of collision with the object is imposed on the arm of the industrial robot. In some case, an object is permitted to move relative to the tool carried by the arm of the industrial robot during operation. In this case, the robot arm should have a possibility that it assumes a positional attitude which enables the object to move freely. To assure properties which satisfactorily meet the aforementioned requirement, an industrial robot is required to have a degree of freedom more than that required for positional displacement (translational movement) of a tool and rotation (adjustment of angle) of the same, that is, mobility. When it is assumed that a position and angle should be completely specified for a tool, there is a need of giving six degrees of freedom to the tool. By doing so, it follows that the industrial robot should have at least seven independent movements in view of the aforementioned requirement. A fact that the industrial robot has an extra degree of freedom means that it can be controlled so as to enable the tool to be held at a required relative position as well as a required relative angle with respect to an object, for instance, during rotation of the arm for enabling the latter to be kept away from some obstruction.

In addition, reachability of a certain industrial robot (properties relative to a range of operation) is dependent on an ability of movement of the industrial robot. In other words, individual components constituting the industrial robot are subjected to a geometrical restriction in the form of crosswise connection between movements of individual arm portions and mechanical final position.

Translational movement of a tool is performed mainly by means of the robot arm, while angular adjustment (rotation) of the tool is achieved by actuating a hand link on the robot. Usually, an industrial robot has three degrees of mobility and a hand link has two or three degrees of mobility. It is desirable that the hand link performs a possibly small amount of translational movement. On the other hand, it is preferable that the arm does not perform an excessive amount of rotation during a small amount of translational movement of the hand link.

Most industrial robots have five or six degrees of mechanically independent movements. For the purpose of realizing required reachability (properties relative to a range of operation), a robot is often placed on a moving track and this leads to a result that the robot can have mobility increased by one degree or in some case, by two degrees. Another measure for solving a problem concerning required reachability (properties relative to a range of operation) is to displace an object relative to a robot using, for instance, a rotational table and/or raising and lowering the table.

FIG. 1 is a perspective view illustrating a conventional industrial robot having eight degrees of mobility.

With respect to the conventional industrial robot, reachability (properties of a range of operation) can be increased by both a moving track and a rotational table.

A thing in common with measures for realizing the aforementioned reachability (properties relative to a range of operation) required for an industrial robot is that all movements should be simultaneously controlled while maintaining independence of mechanical operations irrespective of those inherent to the robot or those given from the outside.

Indeed, it is desirable that an industrial robot has wide versatility and it is preferable that the number of extra accessories or components is reduced to as few as possible. However, the aforementioned requirement for realizing reachability (properties relative to a range of operation) required for an industrial robot has been heretofore met by producing a robot which has the number of movements more than that the number required for duties to be executed. Indeed, an evaluation to be made with respect to the so obtained reachability (properties relative to a range of operation) depends on where and how a movement considered as a target has been achieved.

Overwhelmingly many kinds of robot arms which have been heretofore produced are constructed in a so-called shaft-shaped structure (or shoulder-shaped structure). With respect to robot arms as constructed in this way, a plurality of serially arranged rigid arm segments are supported on a single base on which the arms can be rotated as required. In a case where arms having the aforementioned shaft-shaped structure substantially similar to arms usable for excavating bucket, crane or the like are employed, among a plurality of joint axes along which the respective arms are operatively connected to one after another, at least two axes normally extend in parallel with one another. With such construction, reduction of an increase in certain partial reachability is intended for the purpose of increasing reachability as a whole. In a case where the shaft-shaped structure is employed, an ability of movement is often restricted in order to assure that at least two arm portions operate in an identical plane. This leads to a result that a robot having the aforementioned shaft-shaped structure to effect an increase in reachability is often permitted to have an unnecessarily number of extra movements at a location where a conventional shaft type structure is supplemented with a number more than a mathematically required number of freedom.

Apart from the foregoing shaft-shaped structure, another type of shaft-shaped structure (shoulder-shaped structure) which is employed for a certain kind of work to bring good results with respect to an increase in reachability is such that it includes a series of arms adapted to be successively bent. Namely, the arms do not have any discontinuous joint point. Such a robot arm as mentioned above is constructed by a plurality of elements adapted to directly or indirectly come in rolling contact with one another and these elements are connected to one after another using an actuating element by way of which power is transmitted, for example, a thread. Swedish Patent Application NO. 8304726-6 discloses an embodiment for such a robot arm having seven degrees of mobility or movement. However, it has been found that a principle of operation of an industrial robot explained in the prior invention for which a patent application was filed is restrictively utilized only to an operation with a low accuracy required therefore, such as spray coating or the like, due to weak points involved in the principle and frictional hysteresis.

In addition, it is desirable that an industrial robot is electrically driven using transmission elements having a possibly small number of serial connections and converting elements.

Additionally, there is a requirement that robot arms and a hand link should be hollow to form a passage in which a conduit and a cable are provided at a position located close to a symmetrical axis of the robot. This passage should have a large radius of curvature when the arms and the hand link are bent to a maximum limit. Further, they should be so constructed that conduit and cable are handled carefully.

An ability of orientation of the hand link has been improved in accordance with the same method as that for increasing reachability (properties relative to a range of operation) with respect to an industrial robot. Particularly, the shaft-shaped structure is employed at a location where rotational axes of the hand link intersect each other and thereby an ability of orientation can be obtained by forming a rotational surface which is inclined with respect to the symmetrical axes of the hand link. For the purpose of increasing an ability of orientation of the hand link to accomplish an identical object, in other words, for the purpose of rotating a tool with respect to an object, intersections on the axes should be located possibly close to each other. By employing this method, it is possible to form a rotational point with respect to the tool by a small amount of translational movement or without any translational movement. The Swedish Patent Application No. 8304726-6 discloses a hand link having a high intensity of rotational ability and a small amount of translational movement with respect to a rotational point on the tool.

The present invention has been made with the foregoing background in mind and its object resides in providing a robot arm usable for an industrial robot which assures an extremely high ability of movement, excellent reachability and high accuracy with the aid of direct electrical driving and a central passage through which conduit and cable extend.

DISCLOSURE OF THE INVENTION

According to the present invention, a robot arm usable for an industrial robot is so constructed that an arm portion and a single joint portion is formed with a joint face which is inclined with respect to a longitudinally extending axis thereof, each of the arm portions is rotatable about a joint axis of the joint independently of adjacent one or plural arm portions by allowing the joint axis of the joint to be disposed at a right angle relative to the joint face, and extensions from the inclined joint faces located on opposite ends of an intermediate arm intersect each other at a position located outwardly of the outer boundary of the intermediate arm. By virtue of the above construction, individual rotational shafts contribute to improved reachability of the arm. In addition, since the arm portions restrict relative rotation with respect to the adjacent arms, a high degree of utilization with respect to mobility of each of the arm portions can be reached.

BEST MODE FOR CARRYING OUT THE INVENTION

Figure 1:
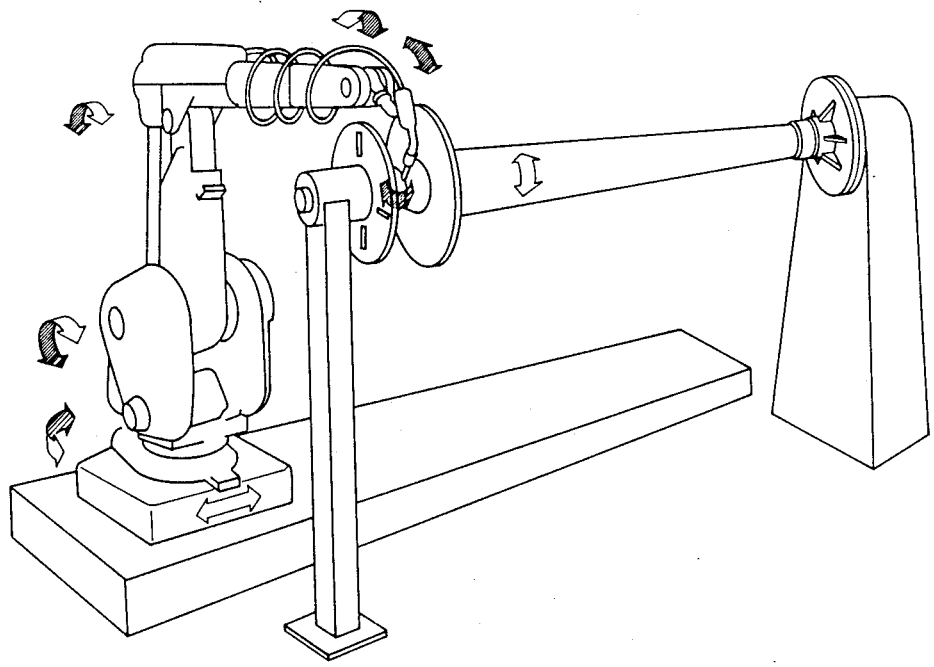
FIG. 1 is a schematic perspective view illustrating a conventional industrial robot.
Figure 2:
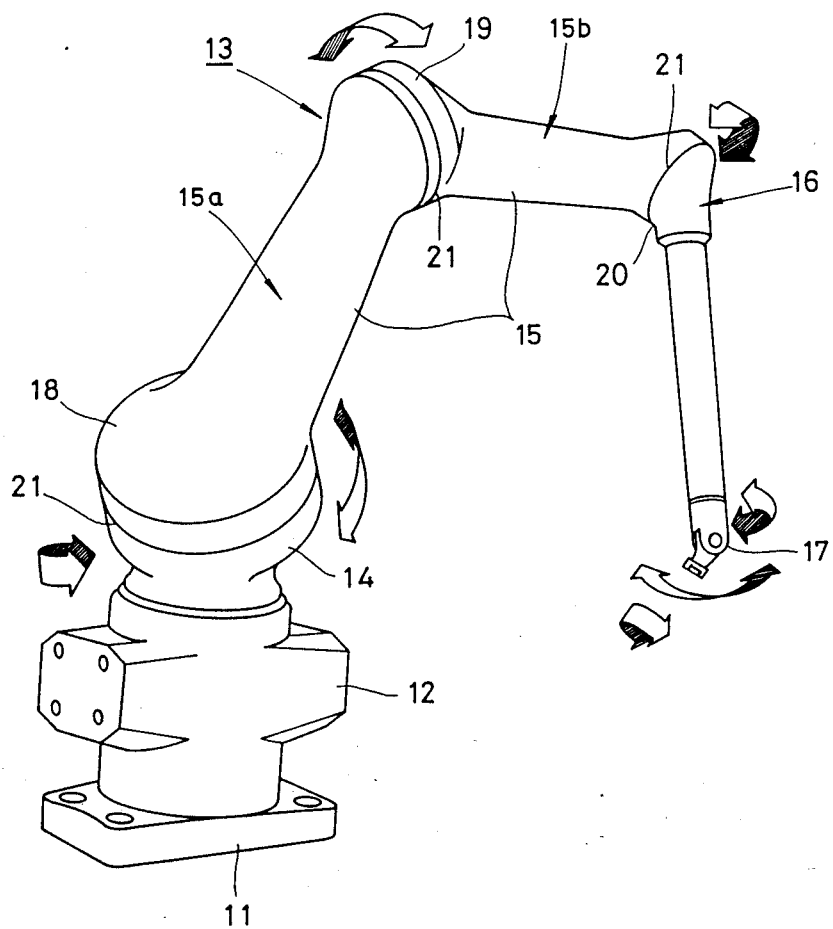
FIG. 2 is a schematic perspective of an industrial robot in accordance with an embodiment of the present invention.
Figure 3:
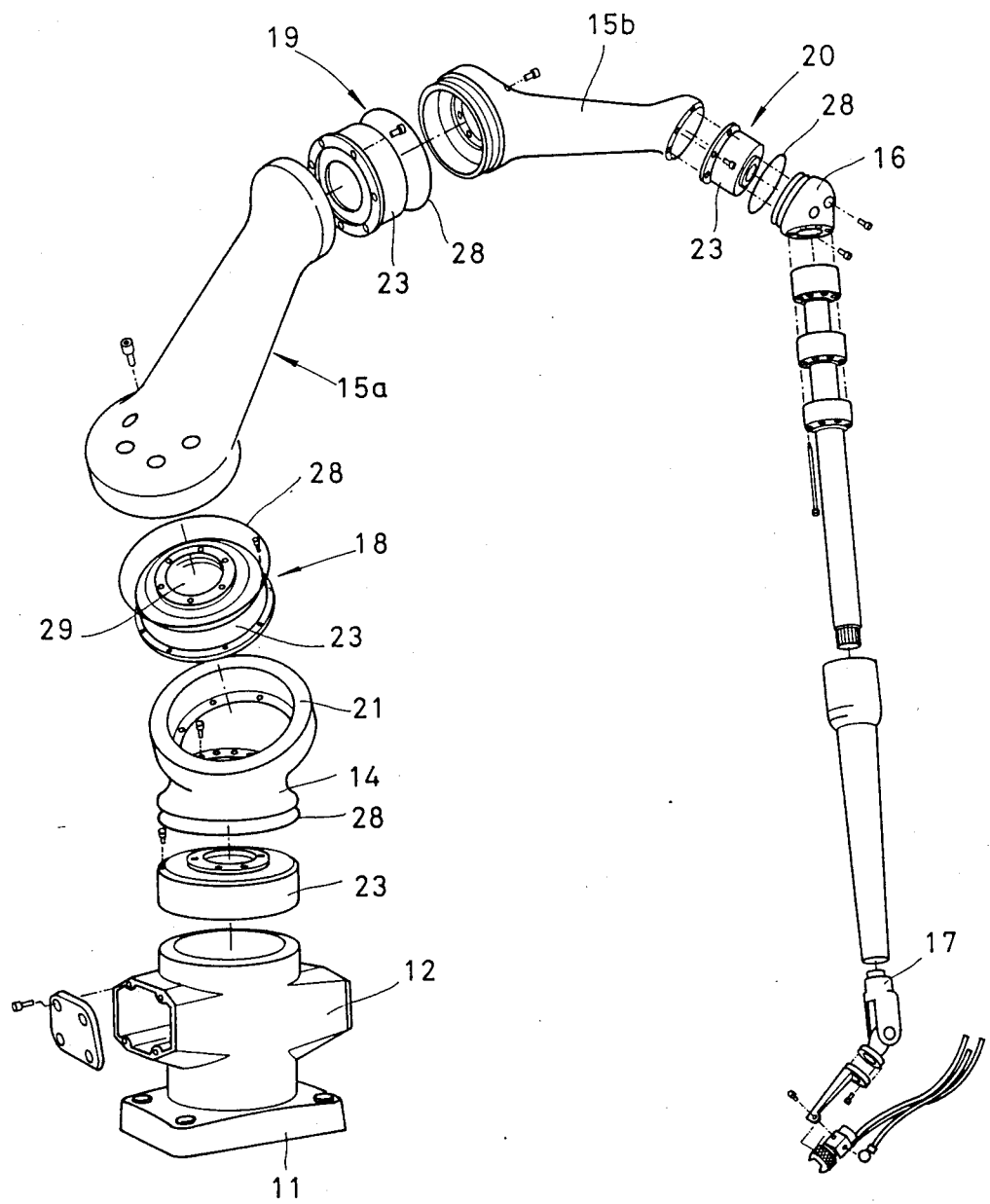
FIG. 3 is a perspective view of the industrial robot of the present invention, shown in a disassembled state.

As shown in FIG. 2, a robot arm of the invention includes a base 12 which is fixedly mounted on a mounting plate 11, and a robot arm 13 comprising a plurality of cylindrical arm portions is rotatably supported on the base 12. The robot arm 13 includes one upper hollow arm or arm member 14, one intermediate hollow arm or arm member 15 and one lower hollow arm or arm member 16. Incidentally, the intermediate arm 15 is divided into at least two intermediate arms 15a and 15b. In addition, the robot arm 13 operatively supports a hand link 17 at its free end.

Figure 4:
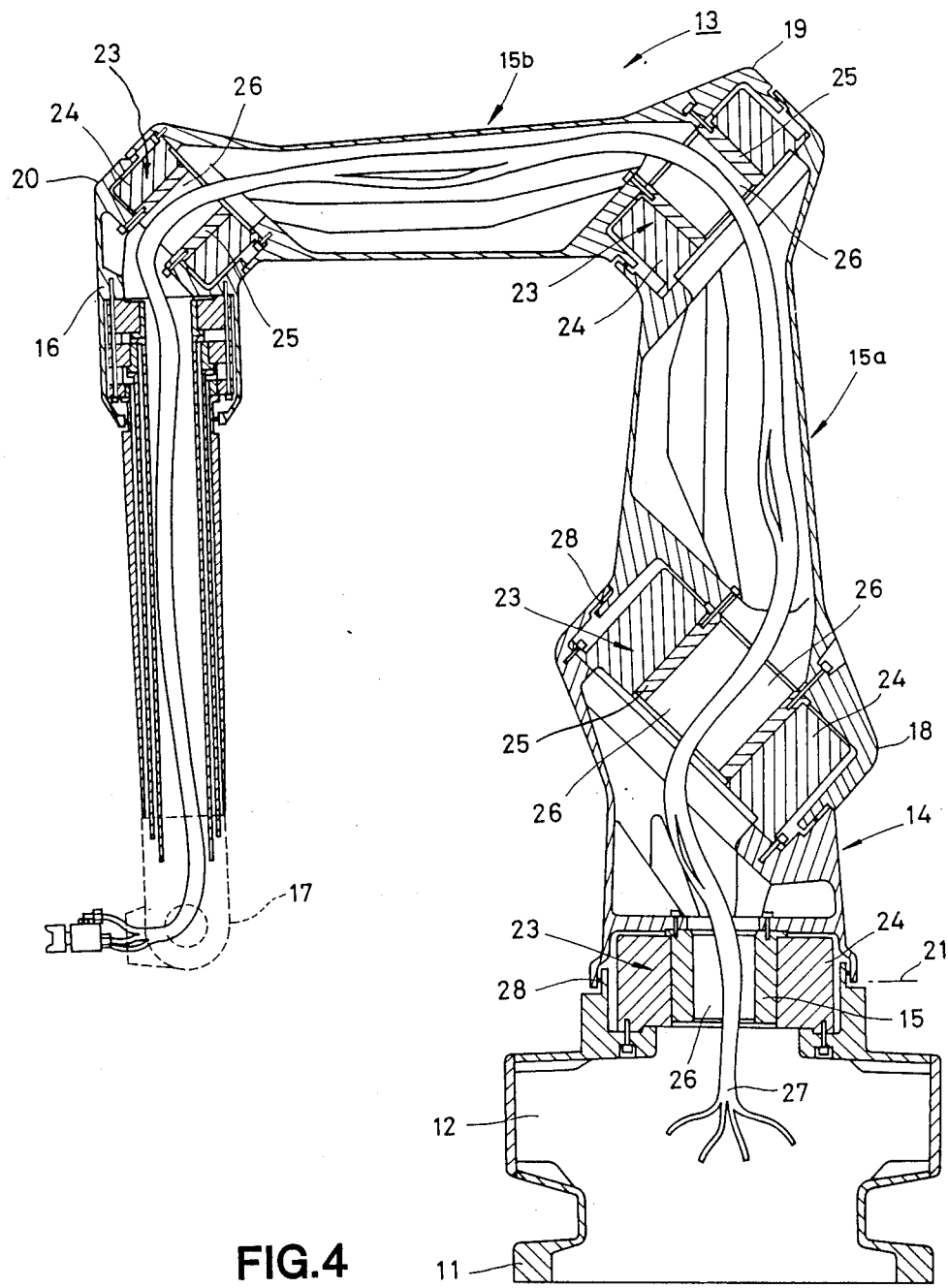
FIG. 4 is a sectional view of the industrial robot of the present invention.

On the other hand, the two intermediate arms 15a and 15b and the lower arm 16 constituting the robot arm 13 are joined to each other via joints 18, 19 and 20 by way of which they are articulately joined together. Each of the two intermediate arms 15a and 15b is formed with a joint face 21 at its opposite ends which is inclined at a certain inclination angle with respect to an axis extending in the longitudinal direction of the arm portion, while each of the upper arm 14 and the lower arm 16 is formed with a joint face 21 at its one end which is likewise inclined at a certain inclination angle with respect to an axis extending in the longitudinal direction of the arm portion. It should be noted that the joint face to which reference has been herein made designates a geometrical plane which belongs to a certain arm portion to perform a predetermined relative movement between both cooperating arm portions. In an usual case, a joint axis 22 of the joint (see FIGS. 5 to 8) is provided perpendicularly with respect to the joint face 21. As shown in FIG. 4, which is a sectional view, each of the joints is equipped with a driving device 23 which is substantially constituted by an electric motor, and a stator 24 of the electric motor constituting the driving device 23 is secured to one pipe portion, while a rotor 25 of the same is threadably engaged with other pipe portion which belongs to the relevant joint. In addition, the driving device 23 is formed with a central through hole 26 through which conduit, cable, conductor or the like generally represented by reference numeral 27 leads to a hand link 17 from the base 12 while passing through hollow arm portions formed in the interior of the robot arm 13. Additionally, arm portions which belong to the joints are formed to overlap each other, and a seal 28 is fitted to the overlapped region. The driving device 23 constituted by the electric motor, which is an ordinary motor, is provided with a bearing element, which is not shown in the drawings, between the stator 24 and the rotor 25. At the same time, this bearing element acts also as a bearing element for the respective arm portion of the respective joint.

As shown in FIG. 5 to 8, the joint face 21 on the intermediate arm 15 can be variously formed in dependence on how the robot arm is applied.

Figure 5:
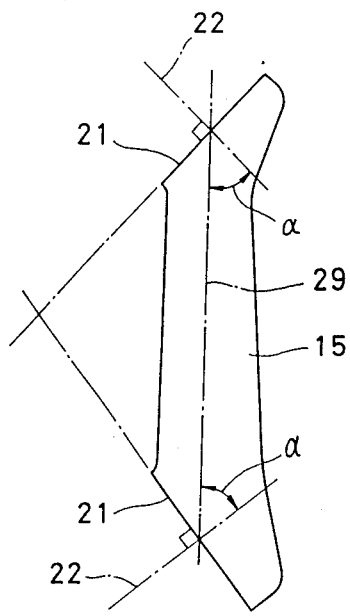
FIGS. 5 to 8 are side views illustrating various type of intermediate arms constituting the industrial robot of the present invention, respectively.
Figure 6:
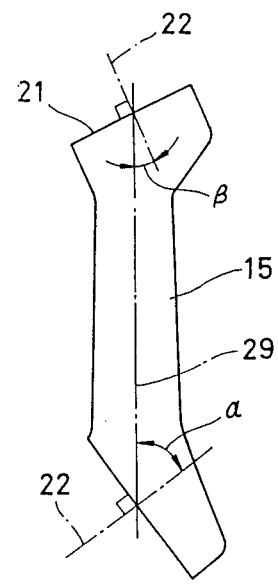
Figure 7:
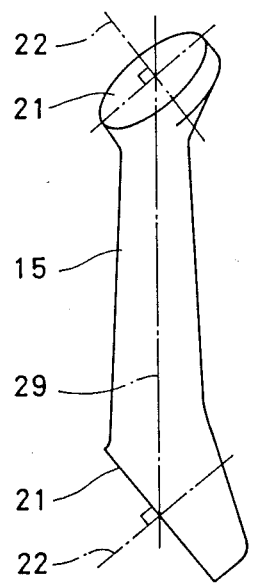
Figure 8:
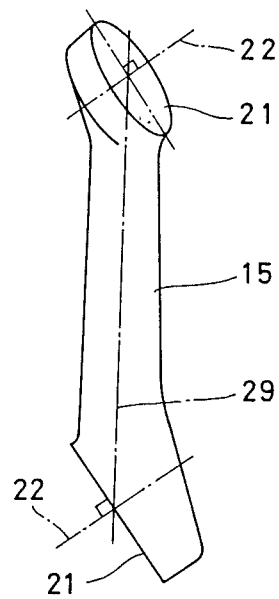

With respect to the intermediate arm 15 as shown in FIG. 5, the joint axes 22 of the respective joint faces 21 are laid on an identical plane and extensions from the respective joint faces 21 intersect each other at a position located outwardly of the outer boundary. Incidentally, the respective joint axes 22 shown in FIG. 5 form an identical angle $\alpha$ with respect to the longitudinally extending axis 29 of the intermediate arm 15. It should be noted that an angle formed by the respective axes 29 with respect to the longitudinally extending axis 29 is not necessarily set to an identical angle $\alpha$ shown in FIG. 5 in dependence on how the industrial robot is utilized. Alternatively, like the intermediate arm 15, as shown in FIG. 5, an angle $\beta$ formed by the upper joint face 21 with respect to the longitudinally extending axis 29 of the intermediate arm 15 may be different from an angle $\alpha$ formed by the lower joint face 21 with respect to the same. In addition, as shown in FIGS. 7 and 8, the respective joint faces 21 on opposite ends of the intermediate arm 15 may be formed at a position where one joint face is twisted with respect to other one. In a case as shown in FIG. 7, the upper joint face 21 is formed at a position where it is twisted by an angle of about 45 degrees with respect to the lower one. It should of course be understood that a twisting angle defined by both the joint faces 21 may be set to an angle more than 45 degrees, as shown in FIG. 8.

Figure 9:
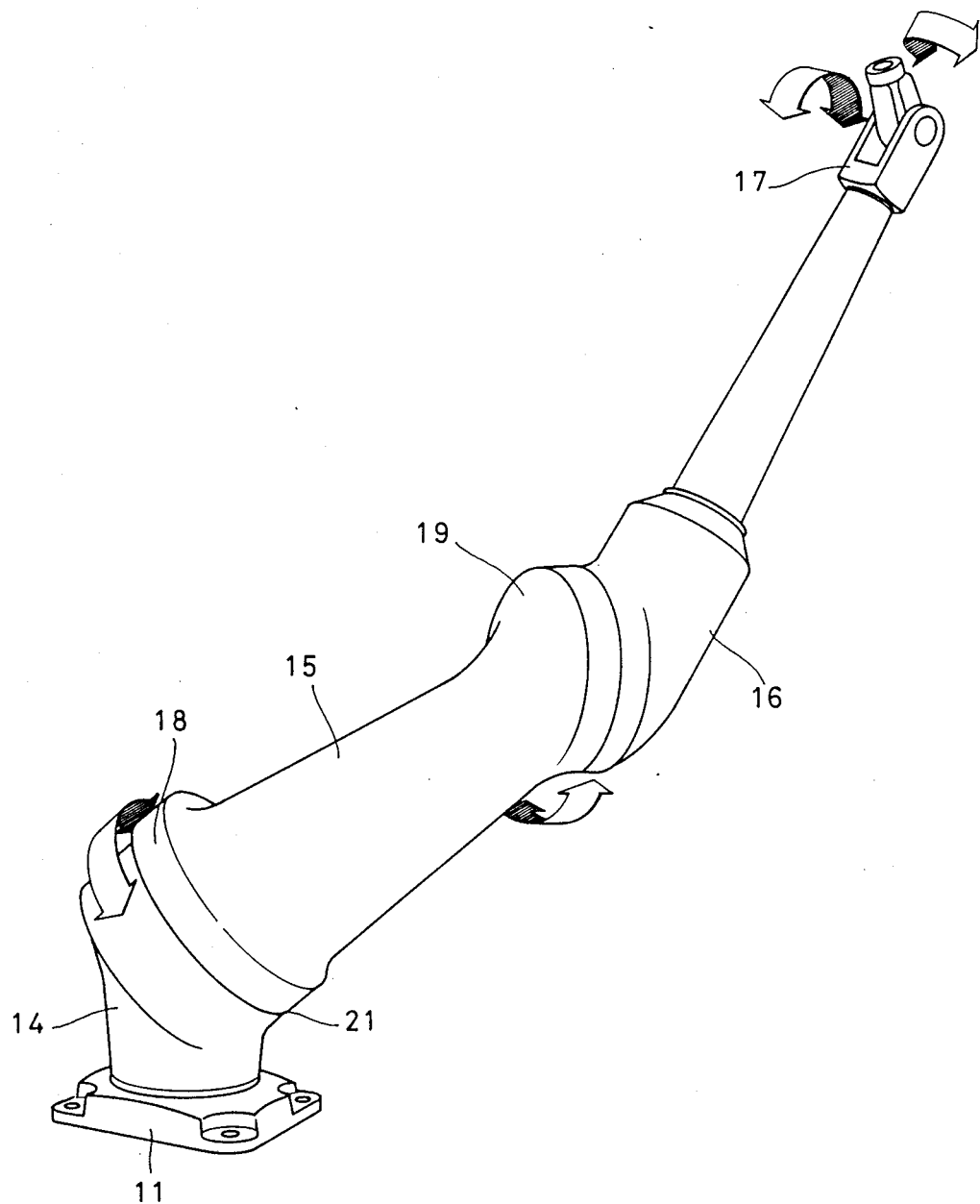
FIG. 9 is a schematic perspective view illustrating an industrial robot in accordance with other embodiment of the present invention.

On the other hand, as shown in FIG. 4, the base 12 for the industrial robot is equipped with the same driving device 23 as that for other joint portions for the purpose of assuring rotation of the whole robot arm 13. It should be noted that a joint face 21 on the base 12 having the driving device 23 attached thereto may extend in the horizontal direction as shown in FIG. 4 or may extend in an inclined state, as shown in FIG. 9, in dependence on condition, such as the purpose of utilization of the industrial robot or the like condition.

Incidentally, the present invention should not be limited only to the embodiment as illustrated in the accompanying drawings and described above. It is obvious that various changes or modifications may be readily made by those skilled in the art without departure from the scope as defined by the appended claims.

INDUSTRIAL APPLICABILITY

As described above, a robot arm of the present invention is suitably employed as for an industrial robot adapted to be used for a variety of operations such as spray coating, arc welding or the like for which a high ability of movement, excellent reachability and high accuracy are required.

I claim:

1. A robot arm adapted for use as an industrial robot comprising a plurality of hollow arm members each having joint portions at opposite ends thereof and a center axis, means for rotatably connecting said arm members to each other at said joint portions; said arm members including an upper arm member, a lower arm member and at least one intermediate arm member therebetween; said intermediate arm member having an outer boundary at each of its joint portions, ends of said joint portions each including a joint face which is inclined at a certain inclination angle with respect to the center axis of an associated arm member, each joint portion having a joint axis disposed at a right angle to its associated joint face, the center axis intersecting the joint axes at opposite joint faces of the same arm member at points of the joint face provided with driving means for each adjacent joint portion; said driving means including an electric motor having a rotor fixed at a joint portion and a rotating shaft thereof being aligned with the associated joint axis, said driving means further including a stator of said electric motor fixed at another of the adjacent joint portions; and a plane through the joint faces on opposite ends of said intermediate arm member intersecting each other at a point located outward of each outer boundary of said intermediate arm member.

2. The robot arm adapted for use as an industrial robot as defined in claim 1 characterized in that said joint portions include a part at which one arm member overlaps another arm member, and a seal is fitted to said overlapped part.

3. The robot arm adapted for use as an industrial robot as defined in claim 1 characterized in that said joint faces located on opposite ends of said intermediate arm member are formed at an identical angle with respect to the center axis of said intermediate arm member.

4. The robot arm adapted for use as an industrial robot as defined in claim 1 characterized in that said joint faces located on opposite ends of said intermediate arm member are formed at a different angle with respect to the center axis of said intermediate arm member.

5. The robot arm adapted for use as an industrial robot as defined in claim 3 characterized in that said joint faces located on opposite ends of said intermediate arm member are formed in twisted in relationship relative to each other.

* * * * *